United States Patent [19]

Wolfe

[11] Patent Number: 5,492,551

[45] Date of Patent: Feb. 20, 1996

[54] AIR FILTER ASSEMBLY

[76] Inventor: Michael Wolfe, 101 W. 90th St., New York, N.Y. 10024

[21] Appl. No.: 233,245

[22] Filed: Apr. 26, 1994

Related U.S. Application Data

[63] Continuation-in-part of Ser. No. 965,764, Oct. 23, 1992, Pat. No. 5,312,467.

[51] Int. Cl.$^6$ ................................................ B01D 46/00
[52] U.S. Cl. ............................ 55/496; 55/511; 55/527; 55/DIG. 39; 55/DIG. 45
[58] Field of Search ........................... 55/493, 496, 511, 55/527, 528, DIG. 39, DIG. 45, 522, 523, 525

[56] References Cited

U.S. PATENT DOCUMENTS

| | | |
|---|---|---|
| 570,219 | 10/1896 | Fiechter . |
| 1,056,722 | 3/1913 | Adler . |
| 2,478,097 | 8/1949 | Glanzer . |
| 2,551,175 | 5/1951 | Smith . |
| 2,615,477 | 10/1952 | Crawley . |
| 3,675,402 | 7/1972 | Weed . |
| 4,022,596 | 5/1977 | Pedersen . |
| 4,225,642 | 9/1980 | Hirakawa . |
| 4,728,349 | 3/1988 | Oshitari . |
| 4,801,383 | 1/1989 | Hoffmann et al. . |
| 4,824,451 | 4/1989 | Vogt et al. . |
| 4,902,306 | 2/1990 | Burnett et al. .......... 55/DIG. 45 |
| 4,904,288 | 2/1990 | d'Augerean . |
| 5,004,487 | 4/1991 | Kowalczyk . |
| 5,037,455 | 8/1991 | Scheineson et al. . |
| 5,312,467 | 5/1994 | Wolfe ........................ 55/493 |

FOREIGN PATENT DOCUMENTS

| | | |
|---|---|---|
| 0015406 | 9/1980 | European Pat. Off. . |
| 6750299 | 9/1968 | Germany . |
| 2622814 | 12/1977 | Germany . |

OTHER PUBLICATIONS

Henry I. Smith et al., "X–ray Lithography, from 500 to 30 nm: X–ray Nanolithography", IBM J. Res. Develop. vol. 33, No. 3, May 1993, pp. 319–329.

D. Saulys et al., "Scanning Tunneling Microscopy Assisted Oxide Surface Etching", J. Appl. Phys. 69(3), Feb. 1, 1991, pp. 1707–1711.

Y. Mizutani et al., "Microporous Polypropylene Sheets", Ind. Eng. Chem. Res., vol. 32, No. 1, 1993, pp. 221–227.

Tetko Inc.—Screening and Filtration Media Product Catalog, pp. 2 and 23.

*Primary Examiner*—C. Scott Bushey
*Attorney, Agent, or Firm*—Bryan Cave; David M. Klein

[57] ABSTRACT

The present invention is an air filter assembly which includes a frame having a filter mounted therein. The filter is constructed of woven microfilament strands having a cross-sectional height of at most 30 microns, the strands being spaced apart by at most 20 microns. The filter medium is single-ply so as to be non-entraining. Each strand preferably has a smooth outer surface for repelling particles smaller than the size of the openings in the filter. The frame may laterally adjustable, if desired. In an alternative embodiment, the filter includes a single-ply sheet of a filtering material having openings cut therein. The filtering material preferably has a smooth outer surface facing the air-flow for preventing the particles from clogging the filter. The openings may be made in the filtering material by processes such as laser cutting, x-ray lithography, chemical etching, or by stretching a microporous sheet. The percentage of the filter surface area that is open to air flow is sufficient to enable air flow without the use of a mechanical blower.

9 Claims, 1 Drawing Sheet

AIR FILTER ASSEMBLY

CROSS-REFERENCE TO RELATED APPLICATION

This invention is a continuation-in-part of U.S. patent application Ser. No. 07/965,764 filed Oct. 23, 1992, now U.S. Pat. No. 5,312,467, the content of which is incorporated herein by reference.

BACKGROUND OF THE INVENTION

1. Field of the Invention

The present invention relates generally to air filtering mediums for small particulate matter, and more particularly to single-layer, non-entraining, air filtering mediums which may be used without a mechanical forced-air ventilation system.

2. Description of Related Art

Air filtering systems for removing deleterious particulate matter are important for general health reasons and are particularly important for persons having allergies, asthmatic conditions and the like. Ventilation of interior spaces is also important for the removal of dampness and airborne chemicals, such as phenols escaping from drapes, furniture, etc.

Small particulate matter and allergenic pollens are usually larger than 15 microns, with most above 20 microns in diameter. Particles in smog range down to 0.01 microns. Air ventilation systems in buildings generally include air filters that require mechanical blowers and other large equipment to force air through the filtering media. These types of filters are designed to remove only large dirt and dust particles and do not remove the small particulate matter discussed above.

It would be desirable to have a physical air filtering medium having openings small enough to effectively filter small particulate matter and allergenic pollens. In particular, it would be desirable to have a non-entraining air filtering system for small particulate matter and allergenic pollens that can be used in non-forced-air (natural) ventilating conditions. As used herein, "non-forced-air natural ventilating" means the movement of air without the use of mechanical blowers or the like.

Another type of air filtering system is the "High Efficiency Particulate Arrestor" (HEPA). These are usually mat type media and require mechanical forced air in order to push air through the filtering medium. They are usually used in units which recirculate interior air.

Air filtering systems designed to remove small particulate matter usually include built-up or blown mat filters that require mechanical forced-air blowers. They function by capturing or collecting the particulate matter on or in the built-up mat filter. As a result, the filter efficiency declines as the filtering medium becomes clogged with particulate matter. Thus, air filters of this type must be periodically cleaned or replaced. Where the air is heavily contaminated with particulate matter, such air filters must be cleaned or replaced quite often. U.S. Pat. Nos. 570,219; 1,056,722; 2,478,097 and 4,022,596 disclose air filtering systems of this type. U.S. Pat. Nos. 2,551,175 and 2,615,477 disclose liquid filtering systems which function by entraining or collecting small particulate matter.

U.S. Pat. Nos. 4,728,349, 4,904,288 and 5,037,455 disclose multi-layered air filters which function by entraining or capturing particulate matter and which utilize mechanical forced-air ventilation to move air through the filter. U.S. Pat. Nos. 4,728,349 and 4,824,451 disclose non-woven, blown mat-type filtering mediums which also require mechanical forced-air.

Other types of air filters are suitable for being mounted in a window frame. For example, U.S. Pat. No. 3,675,402 shows a sliding window air filter assembly utilizing a multilayer filtering medium. This air filter assembly must be cut down to the size of the window opening. Once the frame has been cut, it cannot subsequently be widened.

The key elements for an air filtering medium to prevent entry of small particulate matter in non-forced-air ventilating systems are: (1) the openings in the filtering medium must be sufficiently small enough to prevent the passage of the particulate matter; and (2) the surface-area of the filtering medium must be sufficiently open that a pressure differential across the filtering medium is low enough to permit natural, non-mechanical ventilation.

New processes in material manufacturing, such as microfilament weaving, micro-laser cutting, chemical and photo-etching, x-ray lithography, stretching of microporous sheets, and the like, make it possible to construct a single-membrane filtering media with sufficiently small openings to prevent the passage of small particulate matter and with sufficient openness to provide a low differential pressure across the filter to gain natural ventilation without the necessity of mechanical blowers. Such a filtering media would be particularly useful mounted in an adjustable frame that can be selectively disposed in an opening such as a window. Using smaller and smaller openings, even down to approximately 0.01 microns, in a membrane with sufficient openness, would restrict particles such as those found in industrial smog, while still permitting natural ventilation.

One object of the present invention is to provide an air filtering means which prevents the passage of small size particulate matter without collecting the particulate matter in or on the filtering medium.

Another object of the present invention is to provide an air filtering means that permits natural ventilation, i.e. air flow under low differential pressures without the necessity of forced-air ventilation, but which may also be used with a mechanical blower.

A still further object of the present invention is to provide an air filter system that is self-cleaning and thereby eliminates or substantially reduces the need for short term replacement or cleaning.

Another object of the present invention is to provide an adjustable frame in which the filter medium can be selectively adjusted to varying size openings such as windows.

SUMMARY OF THE INVENTION

These and other objects are achieved by the air filtering system of the present invention.

The present invention is an air filter assembly which includes a frame having a filter mounted therein. The frame may be laterally adjustable, if desired. The filter is constructed of woven microfilament strands having a cross-sectional height (as viewed in a direction of air flow through the filter) of at most 30 microns, the strands being spaced apart by at most 20 microns. The openings in the media are smaller than the particles to be restricted and the single layer prevents particles from being entrained (caught in a mat matrix). A smooth outer surface enhances the ability to repel particles. The microfilament strands may be cylindrical, or cylindrical strands which are calendared (flattened out) before being mounted in the frame. In a preferred method of filtering particles from a flow of air, the woven filtering medium is mounted in the frame assembly and placed in the flow of air.

In an alternative embodiment, the filter includes a single-ply sheet of a filtering material having openings cut therein. Each opening has a maximum diameter less than the minimum diameter of the particles to be filtered for preventing the particles from being passed through the filter. The filtering material preferably has a smooth outer surface facing the air-flow for preventing the particles from clogging the filter. The openings may be cut into the filtering material by any appropriate cutting means, such as by laser cutting, x-ray lithography or chemical etching.

Alternatively, the holes may be created by stretching a microporous plastic sheet. When a plastic sheet, such as polypropylene, is made with fillers and then biaxially stretched, openings are created around the fillers. Then, the fillers are removed to create opening pores. One such commercially available product is "Tokuso NF"™.

The size of the openings in either embodiment will depend upon the size of the particles which are to be repelled. For repelling pollen and the like, the openings are preferably on the order of 20 microns or less. For repelling particles in smog and the like, the openings may be as small as 0.01 micron.

Regardless of the type of filter used, and the size of the openings, the percentage of the filter that is open to air flow must be sufficient to enable air flow without the use of mechanical blowing means. The filter is preferably 13% open or more, but may be open as low as 1%.

In the preferred embodiment, the filter is formed from smooth-surfaced cylindrical microfilament strands having a diameter of 30 microns which are spaced apart at 20 microns (approximately 500 strands per inch). This provides an opening of about 16% of the surface area. In an alternative embodiment in which these strands are calendared, about 13% of the surface area is open.

By etching a smooth filter material, such as by X-ray lithography, openings of about 0.01 microns can be made. These holes are small enough to repel the particles in smog, yet the material may have sufficient openness to enable air to pass therethrough under low differential pressures. The filter media is preferably single-ply for non-entrainment but may have a structural layer for strength.

DESCRIPTION OF THE PREFERRED EMBODIMENT

Figure 1:
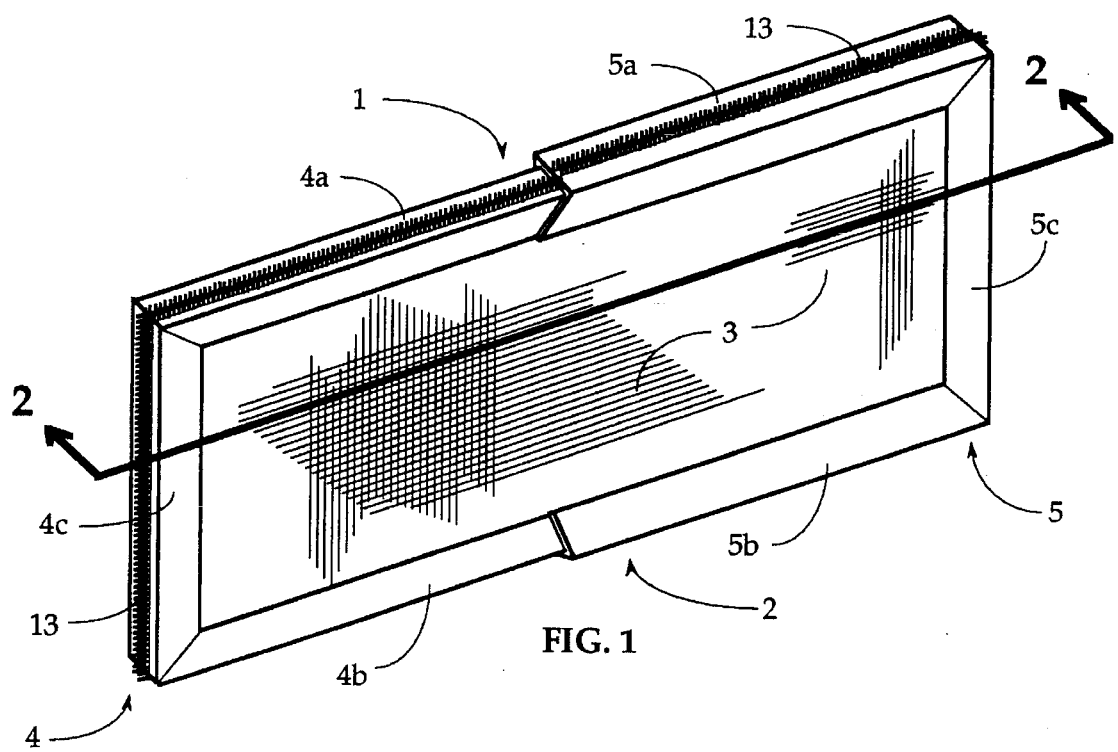
FIG. 1 is a perspective view of the window air filter assembly of the present invention.

FIG. 1 illustrates a front perspective view of a preferred embodiment of the window air filter assembly 1 of the present invention. Air filter assembly 1 generally comprises a laterally-adjustable frame assembly 2 and a woven filtering medium 3 fixedly disposed in frame assembly 2. Frame assembly 2 includes a first frame member 4 which is slidably movable into and out of second frame member 5 for laterally adjusting the size of the frame assembly 2. Frame members 4 and 5 preferably have a C-shaped cross-section. The horizontal legs 5a and 5b of second frame member 5 slidably engage with respective horizontal legs 4a and 4b of first frame member 4.

Figure 2:
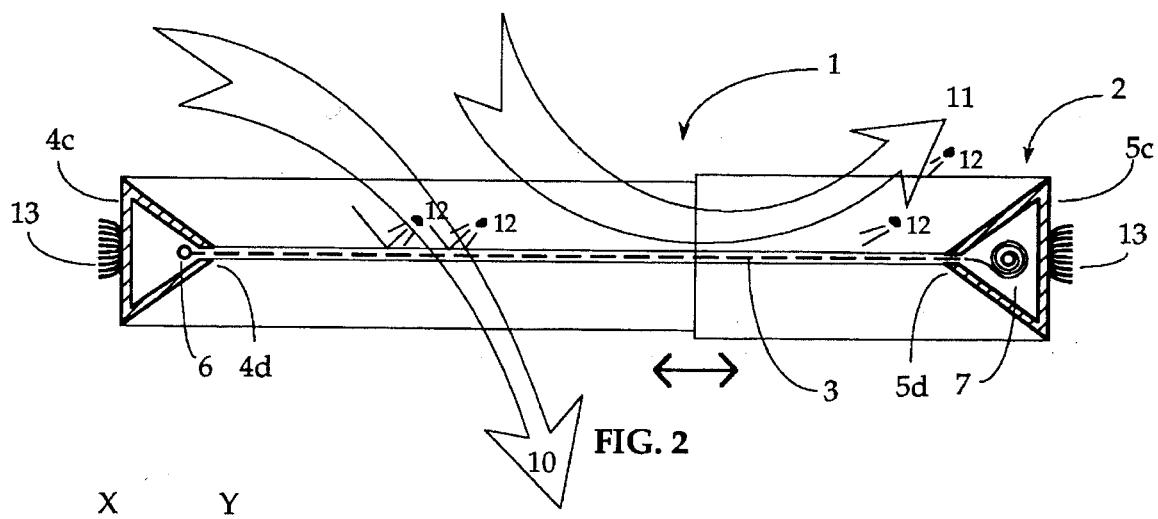
FIG. 2 is a cross-sectional view of the window air filter assembly taken along Section 2—2.

As shown in FIG. 2, a filtering medium anchor or attachment 6 secures the filtering medium 3 in the interior of vertical leg 4c of the first frame member 4. A roller 7 is disposed in the interior of second vertical leg 5c of the second frame member 5. Roller 7 is rotatably attached to second frame member 5. Filtering medium 3 is attached at its ends to anchor 6 and roller 7. Roller 7 preferably includes a conventional spring roller for automatically taking up and releasing the slack in filtering medium 3 as the frame assembly 2 is laterally narrowed or widened. Filtering medium 3 extends through first and second frame member slots 4d, 5d. The slidable relationship of first frame member 4 and second frame member 5 and the laterally expandable attachment of filtering medium 3 therein permits lateral adjustment of the air filter assembly 1 so that it may easily adjust to various-size openings. Of course, the frame assembly 2 may be construed in various shapes and configurations while performing the functions described.

Frame assembly 2 is preferably formed of a waterproof material, and includes weatherstripping 13. In situations where an opening has fixed dimensions, a non-adjustable frame may be used.

Figure 3:
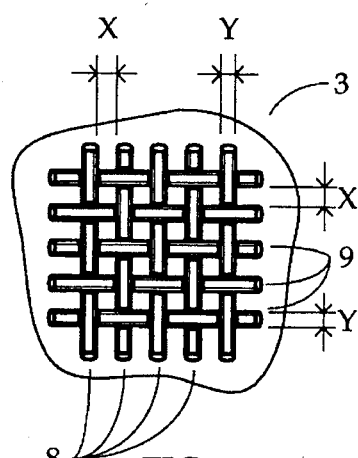
FIG. 3 is an enlarged section of the woven filtering medium of the present invention.

As shown in FIG. 3, filtering medium 3 is preferably formed from woven, smooth-surfaced microfilament strands 8 and 9. Smooth-surfaced microfilament strands 8 and 9 may be, for example, polyester, nylon, polypropylene, carbon, fiberglass, ceramic or metal strands. These strands may be electrostatically treated, if desired. The strands 8 and 9 are fixedly spaced at a predetermined distance X. Each strand 8 and 9 has a crosssectional height Y as viewed from the direction of air flow toward the filter. If strands 8 and 9 are cylindrical, Y corresponds to the diameter of each strand. All of the strands 8 and 9 preferably have the same diameter (if the strands are cylindrical) or cross-sectional height.

Figure 4:
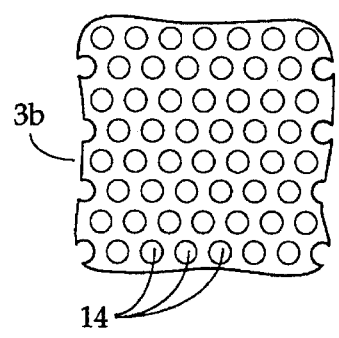
FIG. 4 is an enlarged section of a non-woven filtering medium of the present invention, in which holes are cut by a laser or other means.
Figure 5:
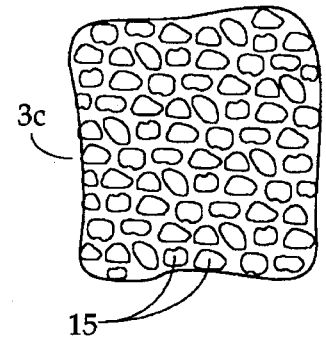
FIG. 5 is an enlarged section of a non-woven filtering medium, such as a filter in which pores are created by chemically etching a single-ply membrane, or by stretching a microporous plastic sheet.

In an alternative embodiment, as shown in FIGS. 4 and 5, a non-woven filter may be used. This filter is constructed from a flat sheet of preferably plastic material having a plurality of openings 14 or 15 formed therein. FIG. 4 shows an embodiment in which holes 14 are drilled or cut, for example by laser or by x-ray lithography, through a single layer sheet of material 3b sized and spaced as described below. FIG. 5 shows an embodiment in which the holes are cut by chemical etching of micropores, or by stretching a microporous plastic sheet.

Regardless of the type of filter, i.e. woven or non-woven, the size of the openings in the filter may vary depending upon the type of particles to be filtered. Also, a sufficient surface area of the filter must be open to permit natural ventilation. The degree of openness which is acceptable to provide natural ventilation will depend upon the particular application in which the filter is used. For general applications, an openness of 13% or more is preferred. However, a lower percentage of openness is acceptable. Filters having an openness down to 2% and 3% can provide an acceptable degree of ventilation. However, a larger percentage open area is preferred. For small spaces such as vehicles, a percentage of openness as low as 1% or even lower might be adequate. In tests of a woven medium 13% open, an air flow of 35–45 cubic feet per minute per square foot at a pressure differential of 0.1 inch of water was achieved. This is sufficient for habitable as well as other types of spaces.

In a preferred embodiment, the filtering medium is formed from smooth surfaced cylindrical microfilaments having a diameter of at most 30 microns, the strands being spaced apart by at most 20 microns. Other embodiments include: a) outer diameter of 15 microns, spaced apart at 15 microns; b) outer diameter of 10 microns, spaced apart at 7 microns; and outer diameter of 30 microns, spaced apart at 20 microns. In an embodiment wherein the strand diameter is 15 microns, and the strands are spaced at 15 microns (approximately 850 strands per inch), approximately 25% of the surface area of the filter will be open.

A filtering medium 3 having microfilament strands 8 and 9 spaced apart (X-distance) at approximately 15 microns, or an equivalent smooth plastic filter 3b or 3c, will prevent the passage of most air-borne pollens. The size of the openings in the filter may be made smaller to restrict smaller and smaller particles. A filtering medium 3 having strands 8 and 9 more closely spaced for filtering even smaller particles would require the use of microfilament strands 8 and 9 having a smaller diameter to retain the necessary openness. For example, if strands 8 and 9 are spaced 1 micron apart, they would need a diameter of 2 microns to achieve an 11% surface area opening. Presently, the minimum size strand commercially used for weaving is 25 microns. For a filtering medium 3 to have a 16% openness, 25 micron-strands must be spaced at most 20 microns apart. This is sufficient for filtering most pollen and the upper range of other small particulate matter.

While generally the microfilament strands 8 and 9 are cylindrical, the cylindrical strands may be calendared, i.e. flattened out, prior to being placed in the frame. The resultant strands are no longer cylindrical, but are flattened somewhat. The resultant openness for 25 micron cylindrical strands which are spaced at 20 microns and then calendared is about 13%. In any case, the cross-sectional height of the strands as viewed from the direction in which air is flowing into the filter should not exceed 30 microns, and the spacing between strands should not exceed 20 microns.

When it is required to filter particles smaller than the smallest openings which may be manufactured in a weaved filter, it is preferred to use the alternate method of manufacture of the filter, i.e. cutting the openings through a sheet of filter material or stretching a microporous sheet. It is foreseen that progressively smaller openings can be obtained using these techniques (x-ray lithography, lasers, chemical etching) and natural ventilating filters for even the smallest particulate matter such as smog or smoke particles down to 0.01 micron can be achieved. The filtering medium preferably has sufficient strength to withstand high pressure fluctuations (wind gusts for example) when used in a single-ply filtering medium. Filters having very small openings may require a mechanical support to prevent tearing of the filter under forces such as the wind. The mechanical support might be, for example, a metal screen.

Regardless of the type of filter used, the filtering material is preferably smooth as viewed from the direction in which air is flowing into the filter. The microfilament strands 8 and 9 of the filtering medium 3 are preferably formed having a smooth outer surface for the purpose of preventing entanglement and entraining of pollen, dirt and the like in the individual strands 8 and 9. Smooth surfaced microfilament strands 8 and 9 are woven to form filtering medium 3, or flat surfaces 3b or 3c having openings 14 and 15 therein, clean the air by reflecting or repelling particulate matter instead of entraining or collecting the particulate matter in the filtering medium. The non-entraining filtering of the present invention extends the useful life of the filtering medium between cleanings, and facilitates self-cleaning of the filtering medium. The filtering medium may be electrostatically charged, if desired, to repel particles and to further prevent them from clogging the filter.

This is shown in FIG. 2. Substantially perpendicular air flow, as illustrated by arrow 10, shows small particulate matter 12 being repelled by the filtering medium 3 by virtue of the sizes of the openings in the filter medium 3 being smaller than the particulate matter. Nonetheless, some small particulate matter 12 may become lodged in filtering medium 3. Since natural ventilating air flow (wind) impinges the filtering medium 3 at a variety of angular orientations, substantially lateral air flow as illustrated by arrow "11" in FIG. 2 will remove small particulate matter lodged in the filtering medium 3. Reverse pressure fluctuations through filtering medium 3 will also facilitate self-cleaning of the filtering medium 3.

Although the invention has been shown and described with respect to certain preferred embodiments, equivalent alterations and modifications will occur to those skilled in the art upon the reading and understanding of this specification. The present invention includes all such equivalent alterations and modifications, and is limited only by the scope of the claims.

I claim:

1. An air filter assembly comprising:

a frame assembly; and a woven filtering medium comprising woven microfilament strands having a cross-section in a direction of air flow through the filtering medium of at most 30 microns, the strands being spaced apart by at most 20 microns, each strand having a smooth outer surface, the filtering medium disposed in the frame assembly;

wherein the filtering medium is non-entraining and reduces the passage of pollen and dust particles through the air filter with reduced clogging, while allowing the free passage of air through the air filter.

2. The air filter assembly according to claim 1 wherein the microfilament strands are cylindrical and have a substantially constant outer diameter of 15 microns, the strands being spaced apart at 15 microns.

3. The air filter assembly according to claim 1 wherein the microfilament strands are cylindrical and have a substantially constant outer diameter of 10 microns, the strands being spaced apart at 7 microns.

4. The air filter assembly according to claim 1 wherein the microfilament strands are cylindrical and have a substantially constant outer diameter of 30 microns, the strands being spaced apart at 20 microns.

5. The air filter assembly according to claim 1 wherein the microfilament strands are calendared cylindrical strands, each of the cylindrical strands having a substantially constant outer diameter of 15 microns prior to being calendared, the calendared strands being spaced apart at 15 microns.

6. The air filter assembly according to claim 1 wherein the microfilament strands are calendared cylindrical strands, each of the cylindrical strands having a substantially constant outer diameter of 10 microns prior to being calendared, the calendared strands being spaced apart at 7 microns.

7. The air filter assembly according to claim 1 wherein the microfilament strands are calendared cylindrical strands, each of the cylindrical strands having a substantially constant outer diameter of 30 microns prior to being calendared, the calendared strands being spaced apart at 20 microns.

8. The air filter assembly according to claim 1 wherein the frame assembly is laterally adjustable.

9. The air filter assembly according to claim 1 wherein the microfilament strands are electrostatically charged.

* * * * *